(12) United States Patent
Irgang et al.

(10) Patent No.: US 10,746,918 B2
(45) Date of Patent: Aug. 18, 2020

(54) LIGHT ASSEMBLY AND LIGHT GUIDE

(71) Applicant: Rebo Lighting & Electronics, LLC, Ann Arbor, MI (US)

(72) Inventors: Todd Irgang, Saline, MI (US); Jon Beattie, Ann Arbor, MI (US); Chris Casanova, Northville, MI (US)

(73) Assignee: Rebo Lighting & Electronics, LLC, Ann Arbor, MI (US)

( * ) Notice: Subject to any disclaimer, the term of this patent is extended or adjusted under 35 U.S.C. 154(b) by 0 days.

(21) Appl. No.: 16/264,850

(22) Filed: Feb. 1, 2019

(65) Prior Publication Data

US 2019/0243056 A1 Aug. 8, 2019

Related U.S. Application Data

(60) Provisional application No. 62/626,323, filed on Feb. 5, 2018.

(51) Int. Cl.
*F21V 8/00* (2006.01)
*F21S 43/235* (2018.01)
*F21S 41/24* (2018.01)

(52) U.S. Cl.
CPC ............ *G02B 6/0076* (2013.01); *F21S 41/24* (2018.01); *F21S 43/235* (2018.01); (Continued)

(58) Field of Classification Search
CPC .. G02B 6/0075; G02B 6/0076; G02B 6/0078; G02B 6/008; G02B 6/0016; G02B 6/0038; G02B 6/0018; G02B 6/0068; G02B 6/0028; G02B 6/0015; G02B 6/002; G02B 6/0021; G02B 6/001; F21S 43/245; F21S 43/246; F21S 43/237; F21S 43/239; F21S 43/241; F21S 43/249; F21S 43/26;
(Continued)

(56) References Cited

U.S. PATENT DOCUMENTS 3,381,124 A 4/1968 Eisenberg
4,578,709 A * 3/1986 Lang .................... G02B 26/101
345/55

(Continued)

FOREIGN PATENT DOCUMENTS

CN 2862269 Y 1/2007
CN 201582735 U 9/2010
(Continued)

OTHER PUBLICATIONS

Light Guide Techniques Using LED Lamps, Application Brief I-003, accessed through MegaLED.com as of Nov. 2017, see e.g. p. 10.

*Primary Examiner* — Erin Kryukova
(74) *Attorney, Agent, or Firm* — Reising Ethington, P.C.

(57) ABSTRACT

A light assembly that acts as a light source multiplier. The light assembly includes a light guide having a light source side and an emitting side with a center portion between the light source side and the emitting side. Both the light source side and the emitting side have a truncated sawtooth shape. The light source side has a plurality of truncated portions and a plurality of apex portions between each truncated portion, with one or more of the apex portions ending in the center portion of the light guide. In some implementations, a number of light guide segments are oriented in a lattice configuration.

14 Claims, 5 Drawing Sheets

(52) U.S. Cl.
CPC ......... *G02B 6/0016* (2013.01); *G02B 6/0018* (2013.01); *G02B 6/0038* (2013.01); *G02B 6/0068* (2013.01)

(58) Field of Classification Search
CPC ................ F21S 41/24; G02F 1/133602; G02F 1/133603; G02F 1/133607; G02F 1/133609
See application file for complete search history.

(56) References Cited

U.S. PATENT DOCUMENTS

| | | | |
|---|---|---|---|
| 6,215,464 B1 * | 4/2001 | Jensen | G09G 3/22 345/84 |
| 6,454,452 B1 | 9/2002 | Sasagawa et al. | |
| 7,168,841 B2 * | 1/2007 | Hsieh | G02B 6/0008 362/558 |
| 7,325,960 B2 | 2/2008 | Chiang et al. | |
| 7,470,038 B2 | 12/2008 | Peng et al. | |
| 7,556,391 B2 | 7/2009 | Matsushita | |
| 7,690,810 B2 | 4/2010 | Saitoh et al. | |
| 7,901,124 B2 | 3/2011 | Gomi et al. | |
| 7,942,546 B2 | 5/2011 | Naijo et al. | |
| 8,123,385 B2 | 2/2012 | Ohkawa | |
| 8,251,562 B2 | 8/2012 | Kuramitsu et al. | |
| 8,337,054 B2 | 12/2012 | Bernard | |
| 8,414,162 B2 | 4/2013 | Pijlman | |
| 8,467,644 B1 | 6/2013 | Kim et al. | |
| 8,646,932 B2 | 2/2014 | Lee et al. | |
| 8,851,725 B2 | 10/2014 | Kloos | |
| D723,199 S | 2/2015 | Lai | |
| D772,447 S | 11/2016 | Lin | |
| 2007/0058359 A1 * | 3/2007 | Saitoh | G02B 5/045 362/97.3 |
| 2008/0186273 A1 * | 8/2008 | Krijn | G02B 6/0021 345/102 |
| 2008/0316766 A1 * | 12/2008 | Ikemoto | B82Y 20/00 362/582 |
| 2009/0273931 A1 | 11/2009 | Ito et al. | |
| 2009/0296017 A1 * | 12/2009 | Itoh | G02B 6/0023 349/61 |
| 2010/0295762 A1 * | 11/2010 | Yeom | G02B 5/0231 345/87 |
| 2010/0315323 A1 | 12/2010 | Cennini et al. | |
| 2011/0007512 A1 | 1/2011 | Kanade et al. | |
| 2011/0013382 A1 * | 1/2011 | Numao | G02B 6/0021 362/97.1 |
| 2011/0149556 A1 * | 6/2011 | Kim | G02B 5/3008 362/97.2 |
| 2011/0157870 A1 | 6/2011 | Liu et al. | |
| 2013/0163283 A1 * | 6/2013 | Tanaka | G02B 6/0018 362/611 |
| 2015/0323724 A1 | 11/2015 | Shinohara et al. | |
| 2016/0070045 A1 * | 3/2016 | Lin | G02B 6/003 362/608 |

FOREIGN PATENT DOCUMENTS

| | | |
|---|---|---|
| CN | 202852690 U | 4/2013 |
| CN | 103791449 A | 5/2014 |
| EP | 2982903 A2 | 2/2016 |
| GB | 2425615 A | 11/2006 |
| KR | 20100105927 A | 10/2010 |
| KR | 101233273 B1 | 2/2013 |
| TW | 201316056 A | 4/2013 |

* cited by examiner

LIGHT ASSEMBLY AND LIGHT GUIDE

FIELD

This invention generally relates to light guides, and more particularly, to light guides for selectively emitting light from a plurality of light sources.

BACKGROUND

Light assemblies including one or more light sources and a light guide may be used to control the emission or output of light from the light sources to achieve a desired appearance. In some applications, such as with vehicle headlamps or taillamps, multiple light sources, such as light emitting diodes (LEDs), may be used. The inclusion of multiple light sources can create higher power demands and/or additional circuitry. Additionally, LEDs can be expensive. Selectively controlling the light distribution from fewer light sources such that it appears as though more light sources are present can help lessen the expense and power demands, as well as simplifying the circuitry.

SUMMARY

In accordance with one or more embodiments, there is provided a light assembly, comprising: a light source; and a light guide, the light guide having a light source side and an emitting side with a center portion between the light source side and the emitting side, wherein the light source is located adjacent the light source side and is configured to emit light into the light source side, through the center portion, and out the emitting side, and wherein both the light source side and the emitting side have a truncated sawtooth shape, wherein the light source side has a plurality of truncated portions and a plurality of apex portions between each truncated portion, wherein one or more apex portions of the plurality of apex portions end in the center portion of the light guide.

In accordance with one or more other embodiments, there is provided a light assembly, comprising: a light source; and a light guide, the light guide having a light source side and an emitting side with a center portion between the light source side and the emitting side, wherein the light source is located adjacent the light source side and is configured to emit light into the light source side, through the center portion, and out the emitting side, and wherein the light source side has a plurality of truncated portions and a plurality of apex portions between each truncated portion, wherein the emitting side has a plurality of truncated portions and a plurality of apex portions between each truncated portion, wherein each apex portion of the plurality of apex portions includes an apex, wherein the apexes of the emitting side are curved and the apexes of the light source side are aligned with the plurality of truncated portions of the emitting side.

In accordance with one or more other embodiments, there is provided a light assembly, comprising: a light source; and a plurality of light guide segments, each light guide segment having a light source side and an emitting side with the light source being located adjacent the light source side, wherein the plurality of light guide segments are oriented in a lattice configuration.

Various aspects, embodiments, examples, features and alternatives set forth in the preceding paragraphs, in the claims, and/or in the following description and drawings may be taken independently or in any combination thereof. For example, features disclosed in connection with one embodiment are applicable to all embodiments in the absence of incompatibility of features.

BRIEF DESCRIPTION OF THE DRAWINGS

Exemplary embodiments will hereinafter be described in conjunction with the appended drawings, wherein like designations denote like elements, and wherein.

DESCRIPTION

The light assemblies and light guides described herein can act as light source multipliers to create an appearance that more light sources are part of the light assembly than are actually present. Simulating additional light sources over a relatively large area may be useful in applications such as light rings or light pipes where several direct LEDs are used for illumination. Using less light sources, such as LEDs, can result in decreased power consumption, cost savings, and more simplified manufacturing in some embodiments. Moreover, the present light guides can be used to achieve a very uniform lit-appearance, and in some embodiments, can give the impression that five times more light sources are used than are actually present. Further, the light guides can prevent the drop-off in intensity with distance, within the light guide, that is typically associated with most light transmitting optics.

Figure 1:
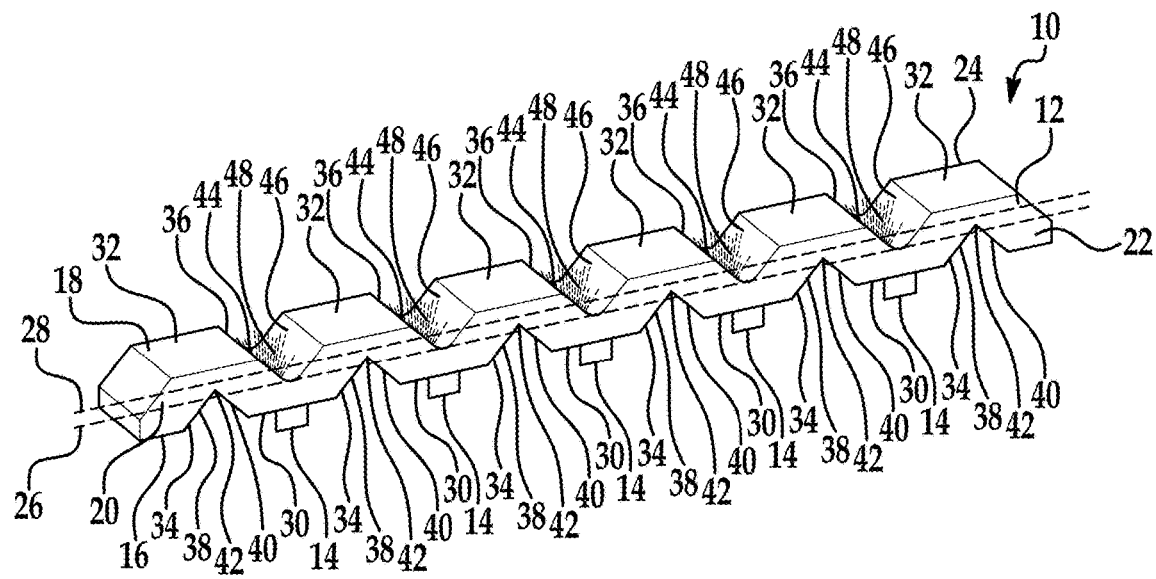
FIG. 1 shows a light assembly in accordance with one embodiment.

FIG. 1 illustrates a light assembly 10 including a light guide 12 and a plurality of light sources 14. The light sources 14 in this embodiment are LEDs, but any operable light source may be used. The light assembly 10 may be used in a variety of different applications, and may include other components as needed, depending on the particular application. For example, the light assemblies described herein may be used in an automotive application such as a taillamp or headlamp, where the light sources 14 are mounted on a printed circuit board (PCB) and the PCB with the light guide 12 are mounted in a protective lens or housing. Other applications are certainly possible.

The light guide 12 has a light source side 16 and an emitting side 18, with a center portion 20 therebetween. The light guide also has first and second lateral sides 22, 24 which generally connect the light source side 16 and the emitting side 18. The light sources 14 are generally located near the light source side 16 such that light travels from the light source side 16 through the light guide 12 and is emitted through the emitting side 18. The light sources 14 may be in contact with the light source side 16 or may be spaced from the light source side 16 depending on the desired configuration. The center portion 20 of the light guide 12 may be generally defined by a first axis 26 and a second axis 28 that delineate the middle 5-85%, approximately, of the light guide. In one embodiment, the center portion 20 is about the middle 50% in area at the first or second lateral side 22, 24 (i.e., the first axis 26 and the second axis 28 are each located at about 25% of the distance from the light source side 16 to the emitting side 18, or 25% of the distance from the emitting side 18 to the light source side 16, respectively).

Each of the light source side 16 and the emitting side 18 have a truncated saw tooth shape consisting of a number of truncated portions 30 on the light source side 16, truncated portions 32 on the emitting side 18, apex portions 34 on the light source side 16, and apex portions 36 on the emitting side 18. The apex portions 34, 36 are located between respective truncated portions 30, 32. Each apex portion 34 of the light source side 16 includes converging walls 38, 40 which meet at an apex 42. Similarly, each apex portion 36 of the emitting side 18 includes converging walls 44, 46 which meet at an apex 48. Each apex portion 34, 36 and respective apex 42, 48 comprise a prism-like shape.

Figure 2:
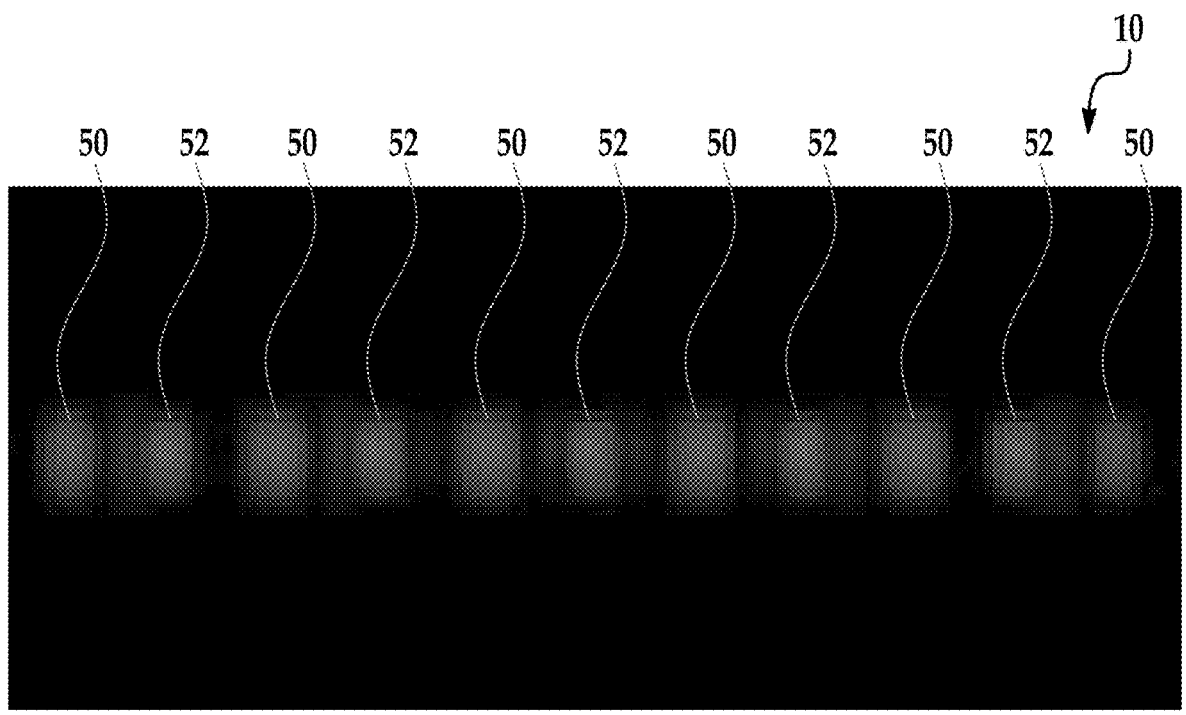
FIG. 2 illustrates output of the light assembly of FIG. 1.
Figure 3:
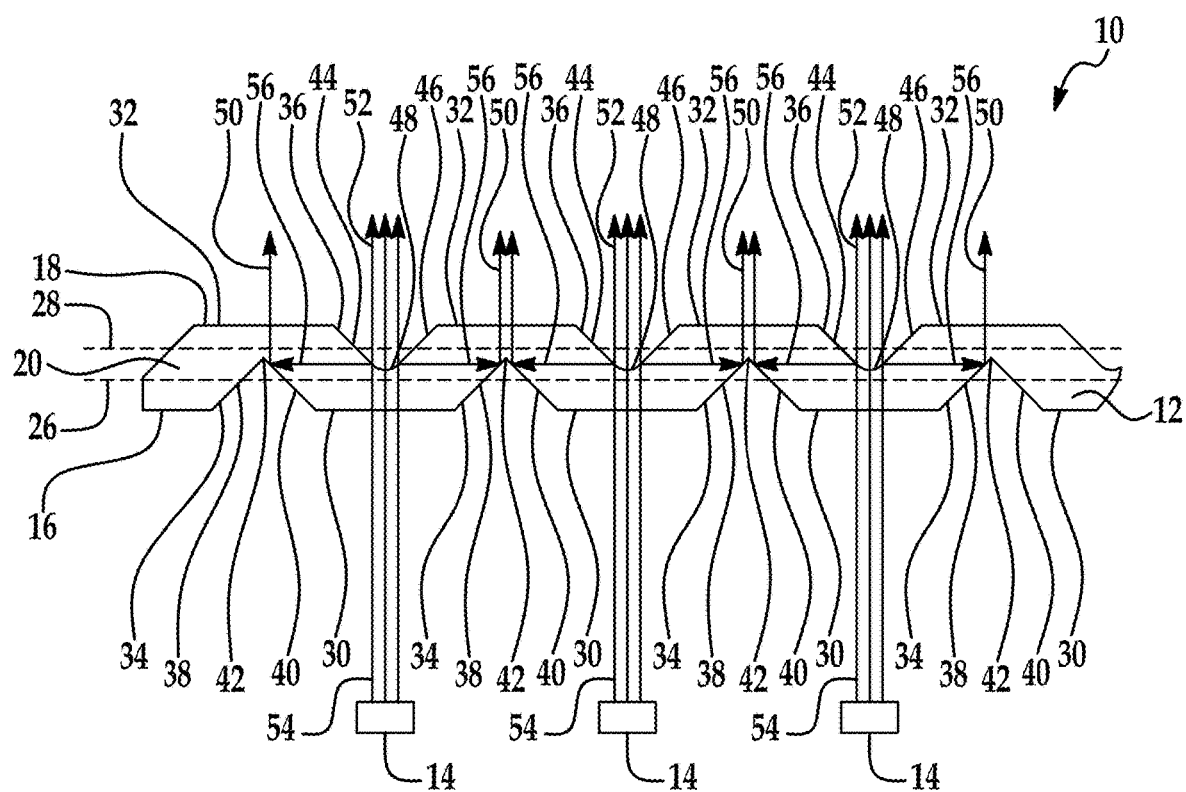
FIG. 3 is a partial, cross-sectional view of the light assembly of FIG. 1.

With reference to FIGS. 2 and 3, the truncated portions 32 of the emitting side 18 form indirect illumination areas 50 and the apex portions 36 of the emitting side 18 form direct illumination areas 52. As shown in FIG. 2, which represents the illuminated light assembly 10 of FIG. 1, five LED light sources 14 appear to be eleven LED light sources (i.e., in this embodiment there are five direct illumination areas 52 and eleven indirect illumination areas 50). Thus, the light guide 12 can act as a light source multiplier to create an appearance that more light sources 14 are present than are actually used in the light assembly 10.

FIG. 3 is a partial, cross-section view of the light guide 12 which shows how incoming light 54 can be transmitted through the light guide. Incoming light 54 from the schematically illustrated light sources 14 enters the light guide 12 at the truncated portions 30 of the light source side 16. In this embodiment, the truncated portions 30 of the light source side 16 are generally aligned with the apex portions 36 of the emitting side 18. At least some of the incoming light 54 is transmitted through the apex 48 of the emitting side 18 to form the direct illumination areas 52. Some incoming light 54 is diverted by the converging walls 44, 46 of the apex portion 36 of the emitting side 18. Diverted light 56 can then reflect against the converging walls 38, 40 of the apex portions 34 of the light source side 16 and form indirect illumination areas 50 at each of the truncated portions 32 of the emitting side 18. In this embodiment, the truncated portions 32 of the emitting side 18 are generally aligned with the apex portions 34 of the light source side 16.

In the illustrated embodiments, each apex portion 34, 36 is an approximate 45° prism. This configuration can help divert an equal portion of the incoming light 54 (i.e., diverted light 56) at the apex portions 34 on the light source side 16 in either direction. At the apex 48 of the apex portion 36 on the emitting side, the surface may be adjusted to tune the amount of light at the direct illumination areas 52. For example, in the illustrated embodiment, the apexes 48 are curved to allow for additional light at each of the direct illumination areas 52. Having a smaller radius of curvature at the apexes 48, or having a smaller angle at the apexes 48 may result in more diverted light 56. Having a larger radius of curvature at the apexes 48, or having a larger angle at the apexes 48, may result in more light at each of the direct illumination areas 52. This configuration may be adjusted depending on the desired output, and may include different prismatic shapes at each apex or the same prismatic shape at each apex, as shown. Further, having the apex portions 34, 36 terminate at the center or in the center portion 20 can provide more focused light output at the indirect illumination areas 50, thereby acting more as a light source multiplier rather than more uniformly distributing the emitted light. Also, the spacing and/or size of the truncated portions 30, 32 and/or the apex portions 34, 36 may be adjusted to change the overall appearance of the light output, depending on the desired implementation.

Figure 4:
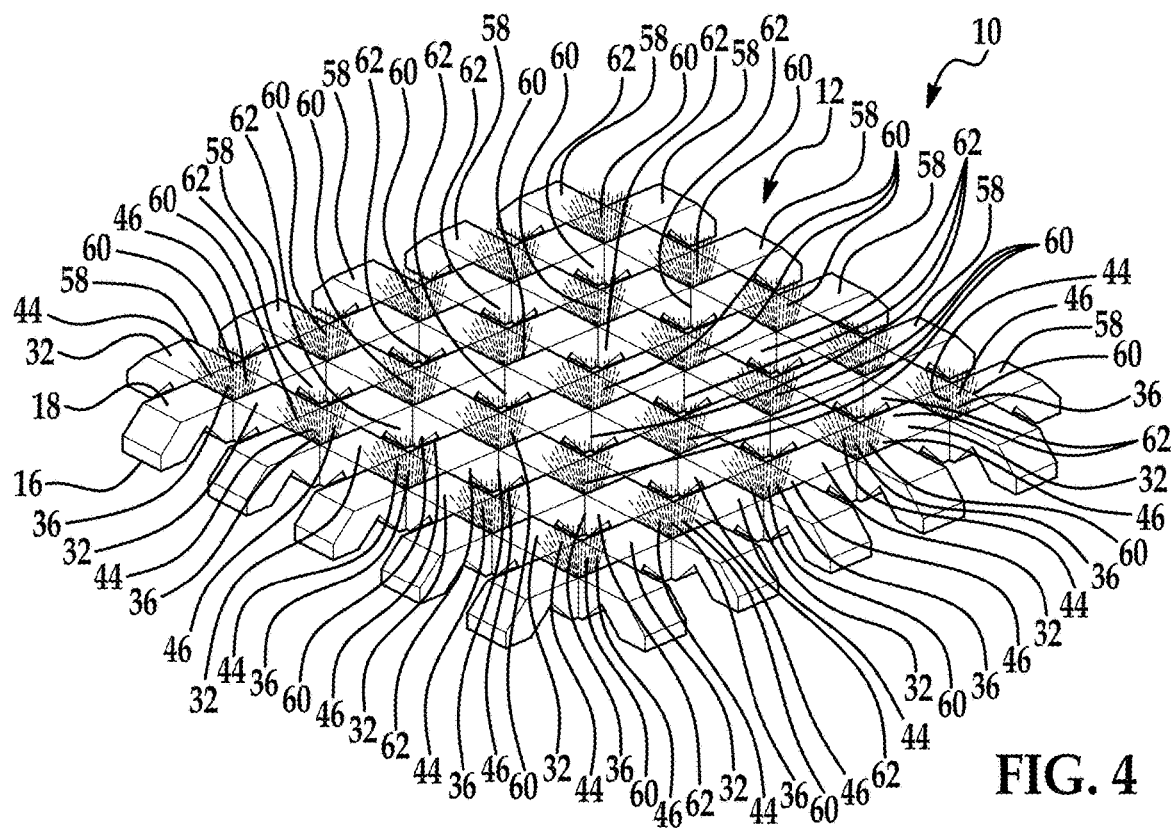
FIG. 4 shows a light assembly having a light guide in accordance with another embodiment.
Figure 5:
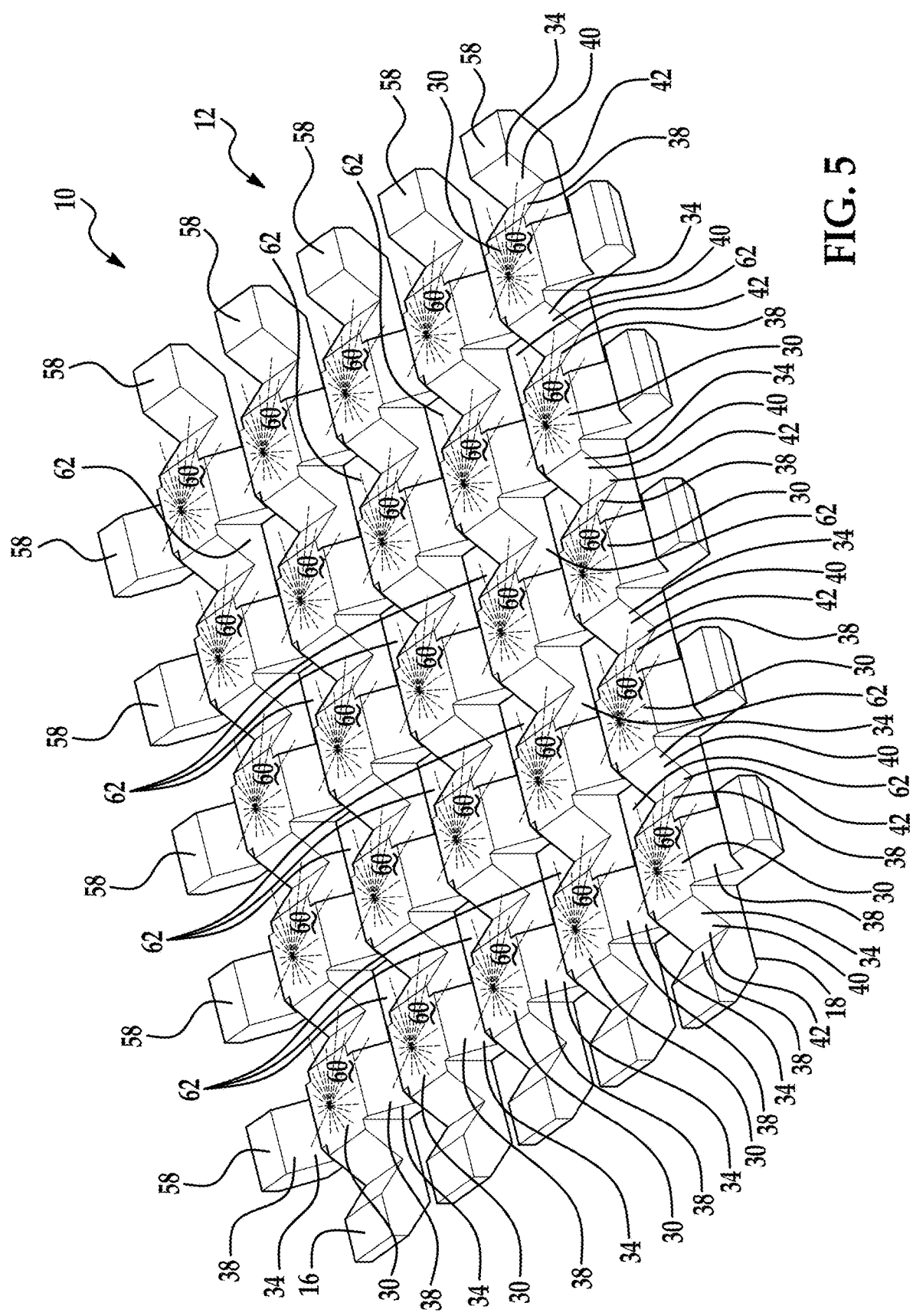
FIG. 5 shows a back view of the light guide of the light assembly of FIG. 4.
Figure 6:
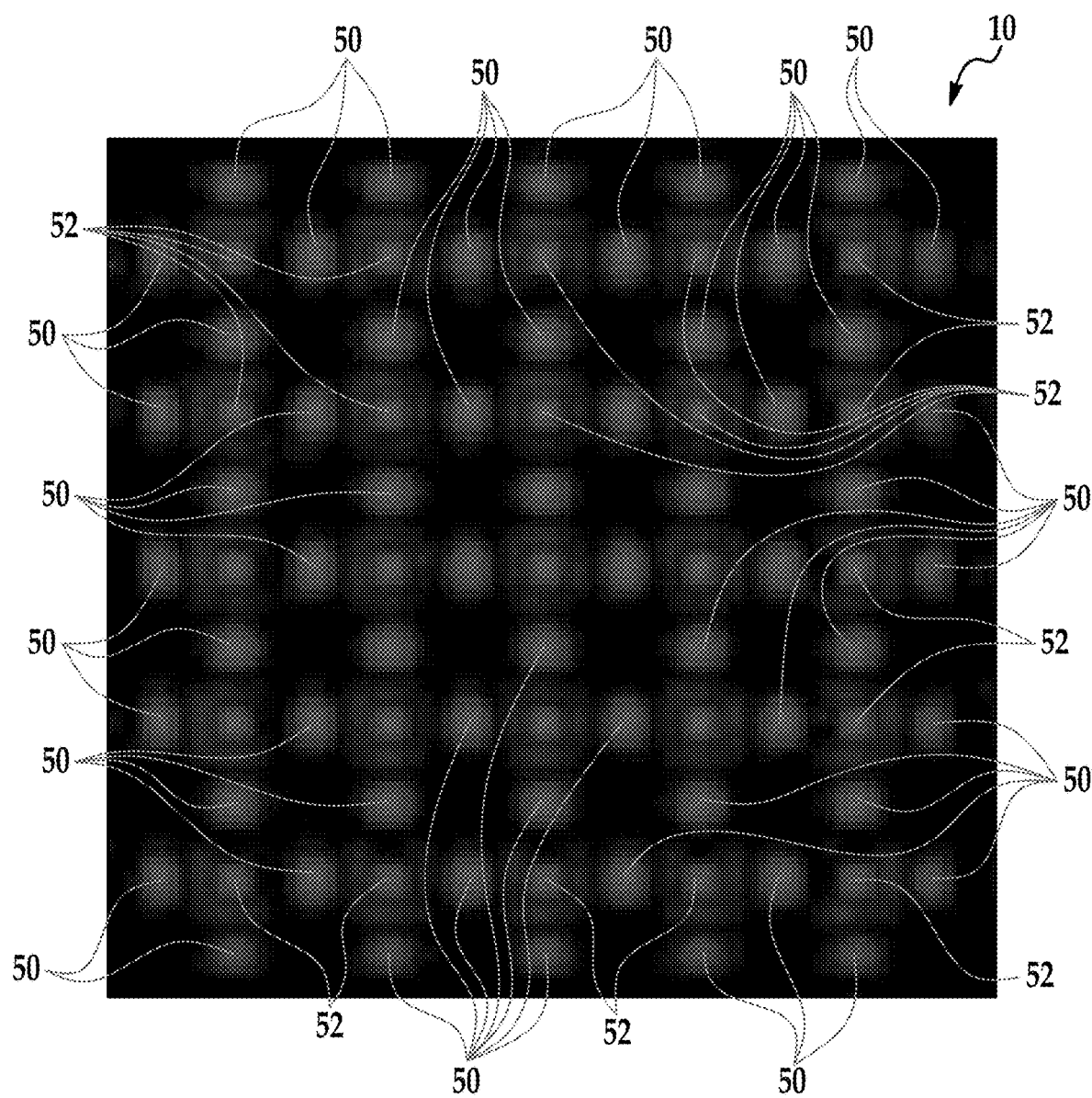
FIG. 6 illustrates output of the light assembly having the light guide of FIGS. 4 and 5.
Figure 7:
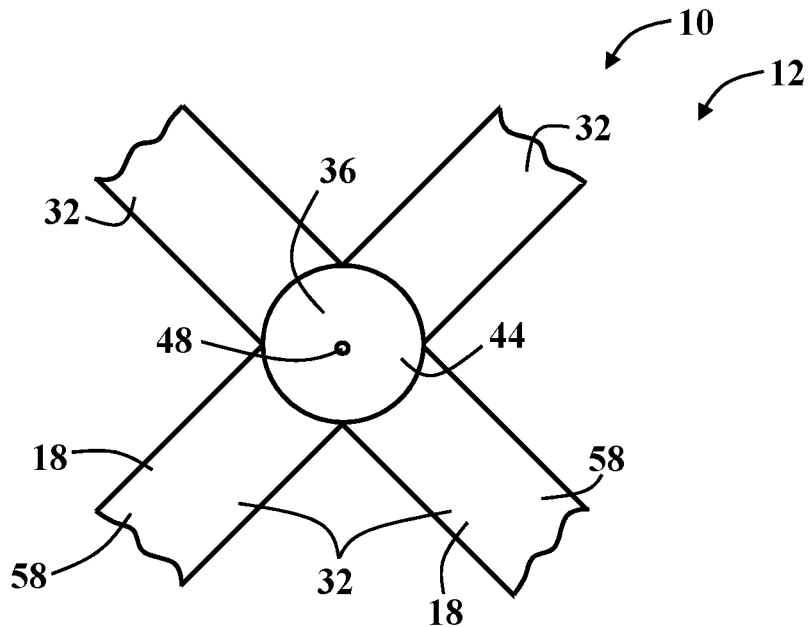
FIG. 7 is a partial, top view of another embodiment of a lattice light assembly, similar to the embodiment illustrated in FIGS. 4-6.
Figure 8:
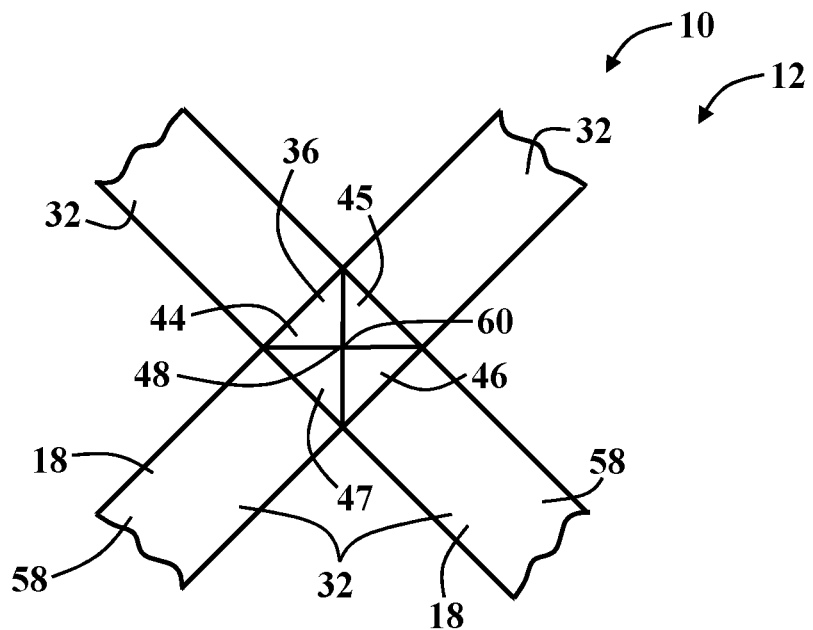
FIG. 8 is a partial, top view of an embodiment of a lattice light assembly, showing a pyramidal-shaped prism intersection point.

FIGS. 4-6 illustrate another embodiment of a light assembly 10 and light guide 12 (light sources not shown). FIG. 4 is an isometric view of the light guide 12, showing the emitting side 18. FIG. 5 is a bottom quasi-isometric view of the light guide 12, showing the light source side 16. FIG. 6 represents the illuminated light assembly 10 of FIGS. 4 and 5. In this embodiment, the light guide 12 has a plurality of light guide segments 58 that are oriented in a lattice configuration. In this embodiment, the light guide segments 58 are linear light guide segments that form a grid-like configuration when oriented orthogonally relative to each other, as illustrated. This embodiment includes a number of intersection points 60 where crossed light guide segments 58 intersect and through holes 62. Each light guide segment 58 may have a similar configuration as the embodiment in FIGS. 1-3, with a number of truncated portions 30, 32 and apex portions 34, 36, with the truncated portions and apex portions being labeled on the first two intersecting light guide segments 58 only in FIGS. 4 and 5 for clarity purposes. Each apex portion 36 on the emitting side may have a single converging wall 44 (e.g., a cone shape as shown in FIG. 7), or as illustrated in FIG. 8, may include a plurality of converging walls 44, 45, 46, 47. Accordingly, in the embodiments of FIGS. 4-6 and 8, the apex portions 36 of the emitting side 18 may form pyramidal-shaped prism intersection points 60. As with the previous embodiment, the shape of the apex may be adjusted to tune the amount of light emitted at each particular apex portion, whether on the light source side 16 or the emitting side 18.

FIG. 6 illustrates an illuminated light assembly 10 showing the indirect illumination areas 50, which occur at the truncated portions 32 on the emitting side 18, and the direct illumination areas 52 which occur at the intersection points 60 at the apex portions 36 on the emitting side 18 (for clarity purposes, only some of the indirect illumination areas 50 and direct illumination areas 52 are designated). This particular embodiment can provide the appearance that over three times more light sources are present than are actually used. It should be noted that the holes or recesses in the light assembly 10 could be omitted. For example, additional light sources or LEDs, or a different configuration of the LEDs in the light guide matrix can be used to fill in the holes or recesses.

It is to be understood that the foregoing is a description of one or more preferred example embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A light assembly, comprising:
a light source; and
a light guide, the light guide having a light source side and an emitting side with a center portion between the light source side and the emitting side, wherein the light source is located adjacent the light source side and is configured to emit light from the light source into the light source side, through the center portion, and out the emitting side, and
wherein both the light source side and the emitting side have a truncated sawtooth shape, wherein the light source side includes:
a plurality of truncated portions and a plurality of apex portions, each apex portion of the plurality of apex portions having an apex of a prism-like shape, wherein each apex portion of the plurality of apex portions of the light source side is located between two truncated portions of the light source side, wherein one or more apex portions of the plurality of apex portions of the light source side end in the center portion of the light guide,
wherein the emitting side includes:
a plurality of truncated portions and a plurality of apex portions, each apex portion of the plurality of apex portions of the emitting side having an apex of a prism-like shape, wherein each apex portion of the plurality of apex portions of the emitting side is located between two truncated portions of the emitting side,
and wherein the light guide is configured such that the light from the light source is directed to a direct illumination area at one of the apex portions of the emitting side and directed to an indirect illumination area at one of the truncated portions of the emitting side, and at the direct illumination area, the light from the light source travels straight from one of the truncated portions of the plurality of truncated portions of the light source side through the light guide and out of one of the apex portions of the plurality of apex portions of the emitting side.

2. The light assembly of claim 1, wherein the center portion is defined by a first axis and a second axis, wherein the first axis and the second axis delineate the middle 5-85% of the light guide.

3. The light assembly of claim 1, wherein the light guide has a first lateral side and a second lateral side, wherein the first lateral side and the second lateral side each connect the light source side and the emitting side.

4. The light assembly of claim 3, wherein the center portion includes a middle 50% in area at the first lateral side or the second lateral side.

5. The light assembly of claim 1, wherein at least some of the truncated portions of the light source side are aligned with at least some of the apex portions of the emitting side.

6. The light assembly of claim 1, wherein at least some of the apexes of the emitting side are curved and at least some of the apexes of the light source side are not curved.

7. The light assembly of claim 1, at least some of the apexes of the emitting side have a smaller prismatic angle than at least some of the apexes of the light source side.

8. A lattice light assembly comprising a plurality of light assemblies according to claim 1, wherein each light guide of the plurality of light guides is oriented as a light guide segment in a lattice configuration.

9. A light assembly, comprising:
a light source; and
a light guide, the light guide having a light source side and an emitting side with a center portion between the light source side and the emitting side, wherein the light source is located adjacent the light source side and is configured to emit light into the light source side, through the center portion, and out the emitting side, and
wherein the light source side includes:
a plurality of truncated portions and a plurality of apex portions, each apex portion of the plurality of apex portions having an apex of a prism-like shape, wherein each apex portion of the plurality of apex portions of the light source side is located between two truncated portions of the light source side,
wherein the emitting side includes:
a plurality of truncated portions and a plurality of apex portions, each apex portion of the plurality of apex portions of the emitting side having an apex of a prism-like shape, wherein each apex is curved and each apex portion of the plurality of apex portions of the emitting side is located between two truncated portions of the emitting side,
and wherein the light guide is configured such that the light from the light source is directed to a direct illumination area at one of the apex portions of the emitting side and directed to an indirect illumination area at one of the truncated portions of the emitting side, and at the direct illumination area, the light from the light source travels straight from one of the truncated portions of the plurality of truncated portions of the light source side through the light guide and out of one of the apex portions of the plurality of apex portions of the emitting side.

10. A lattice light assembly comprising a plurality of light assemblies according to claim 9, wherein each light guide of the plurality of light guides is oriented as a light guide segment in a lattice configuration.

11. A lattice light assembly, comprising:
a light source; and
a plurality of linear light guide segments, each light guide segment having a light source side and an emitting side with the light source being located adjacent the light source side, the plurality of linear light guide segments are oriented in a grid-like configuration,
wherein each light guide segment has a center portion between the light source side and the emitting side, the light source is configured to emit light into the light source side, through the center portion, and out the emitting side of at least one of the plurality of light guide segments,
wherein both the light source side and the emitting side of each light guide segment of the plurality of light guide segments has a truncated sawtooth shape, each light source side has a plurality of truncated portions and a plurality of apex portions, each light source side apex portion has an apex of a prism-like shape, each light source side apex portion is located between two light source side truncated portions, each emitting side has a plurality of indirect illumination areas that occur at a plurality of emitting side truncated portions, and each emitting side has a plurality of direct illumination areas that occur at a plurality of intersection points where light guide segments cross in the grid-like configuration;

wherein the emitting side of two or more light guide segments are configured to include three times or more of the indirect illumination areas than the direct illumination areas.

12. The lattice light assembly of claim 11, wherein each emitting side has a plurality of apex portions, each apex portion of the plurality of emitting side apex portions having a curved apex of a prism-like shape, wherein each apex portion of the plurality of emitting side apex portions is located between two emitting side truncated portions.

13. The lattice light assembly of claim 12, wherein each apex portion of the plurality of apex portions of each emitting side have a single converging wall.

14. The lattice light assembly of claim 11, wherein each emitting side has a plurality of apex portions, each apex portion of the plurality of emitting side apex portions having a curved apex of a prism-like shape, wherein each apex portion of the plurality of emitting side apex portions is located between two emitting side truncated portions, and wherein each apex portion of the plurality of apex portions of the emitting side form pyramidal-shaped prism intersection points.

* * * * *